United States Patent
Furlani et al.

(10) Patent No.: US 12,071,374 B2
(45) Date of Patent: Aug. 27, 2024

(54) CONCRETE MIX DESIGN AND METHOD FOR REALIZING DAM OR OTHER MASSIVE STRUCTURE BY USING THE CONCRETE MIX DESIGN

(71) Applicant: SIMEM S.p.A., Minerbe (IT)

(72) Inventors: Federico Furlani, Minerbe (IT); Christopher Hicks, Minerbe (IT); Michele Furlani, Minerbe (IT)

(73) Assignee: SIMEM S.P.A., Minerbe (IT)

( * ) Notice: Subject to any disclaimer, the term of this patent is extended or adjusted under 35 U.S.C. 154(b) by 262 days.

(21) Appl. No.: 17/611,853

(22) PCT Filed: May 15, 2020

(86) PCT No.: PCT/IB2020/054631
§ 371 (c)(1),
(2) Date: Nov. 16, 2021

(87) PCT Pub. No.: WO2020/234724
PCT Pub. Date: Nov. 26, 2020

(65) Prior Publication Data
US 2022/0234951 A1 Jul. 28, 2022

Related U.S. Application Data

(60) Provisional application No. 62/849,389, filed on May 17, 2019.

(51) Int. Cl.
| | | |
|---|---|---|
| C04B 18/08 | (2006.01) | |
| C04B 14/06 | (2006.01) | |
| C04B 103/30 | (2006.01) | |
| C04B 103/44 | (2006.01) | |
| C04B 111/00 | (2006.01) | |

(52) U.S. Cl.
CPC .............. *C04B 18/08* (2013.01); *C04B 14/06* (2013.01); *C04B 2103/304* (2013.01); *C04B 2103/44* (2013.01); *C04B 2111/00103* (2013.01)

(58) Field of Classification Search
CPC ................... C04B 18/08; C04B 14/06; C04B 2103/304; C04B 2103/44; C04B 2111/00103; C04B 2111/00146; C04B 2111/1006; C04B 2111/62; C04B 2201/20; C04B 28/04; Y02W 30/91
See application file for complete search history.

(56) References Cited

FOREIGN PATENT DOCUMENTS

| | | |
|---|---|---|
| CN | 107777961 A | 3/2018 |
| WO | 2012122433 A1 | 9/2012 |

OTHER PUBLICATIONS

International Search Report for PCT/IB2020/054631, Jul. 21, 2020, 3 pages.

*Primary Examiner* — Anthony J Green
(74) *Attorney, Agent, or Firm* — FERENCE & ASSOCIATES LLC (57) ABSTRACT

A concrete mix, including: cementitious content between 25 and 200 kg/m³; fly ash content between 25 and 175 kg/m³; dirty sand with fine aggregates between 3% and 20%; water content between 150 l/m³ and 250 l/m³; and a chemical admixture comprising one or more components selected from the following: an acrylic, formaldehyde-free polymer-based admixture, modified in aqueous solution; a surfactant admixture configured to entrain micro air bubbles in concrete; and an organic polymer comprising hydrophilic groups for increasing the viscosity of the mixture.

14 Claims, 5 Drawing Sheets

DETERMINATION OF SIEVE ANALYSIS UNI EN 933/1

| Aggregates | Capsrolite Sand | | Sand 2/0 | | Gravel 4-8 | | Gravel 8-16 | | Gravel 16-22 | | Gravel 25-40 | |
|---|---|---|---|---|---|---|---|---|---|---|---|---|
| Sieves | part. | % pass | part. | % pass | part. | % pass | part. | % pass | part. | % pass | part. | % pass |
| 50,000 | | 100,0 | | 100,0 | | 100,0 | | 100,0 | | 100,0 | | 100,0 |
| 40,000 | | 100,0 | | 100,0 | | 100,0 | | 100,0 | | 100,0 | | 100,0 |
| 31,500 | | 100,0 | | 100,0 | | 100,0 | | 100,0 | | 100,0 | 422,7 | 85,9 |
| 25,000 | | 100,0 | | 100,0 | | 100,0 | | 100,0 | | 100,0 | 895,5 | 56,0 |
| 22,400 | | 100,0 | | 100,0 | | 100,0 | | 100,0 | 31,6 | 98,3 | 734,8 | 31,5 |
| 20,000 | | 100,0 | | 100,0 | | 100,0 | | 100,0 | 455,4 | 84,1 | 519,2 | 14,1 |
| 16,000 | | 100,0 | | 100,0 | | 100,0 | 117 | 92,3 | 1885,7 | 21,2 | 242 | 6,1 |
| 14,000 | | 100,0 | | 100,0 | | 100,0 | 197 | 78,1 | 437,1 | 6,7 | 25,7 | 5,2 |
| 12,500 | | 100,0 | | 100,0 | | 100,0 | 221,9 | 64,2 | 170,8 | 1,0 | 58,6 | 3,3 |
| 10,000 | | 100,0 | | 100,0 | | 100,0 | 489,2 | 31,6 | 19,2 | 0,3 | 74,0 | 0,8 |
| 8,000 | | 100,0 | | 100,0 | 100,0 | 92,7 | 373,3 | 6,6 | | 0,3 | 12,1 | 0,4 |
| 6,300 | 5,4 | 99,3 | | 100,0 | 458,8 | 62,1 | 79 | 1,3 | | 0,3 | | 0,4 |
| 4,000 | 96 | 87,3 | | 100,0 | 765,5 | 11,1 | 9,6 | 0,7 | | 0,3 | | 0,4 |
| 2,800 | 95,8 | 75,3 | | 100,0 | 143,7 | 1,3 | | 0,7 | | 0,3 | | 0,4 |
| 1,000 | 76,4 | 65,8 | 54,4 | 90,9 | 14,6 | 0,4 | | 0,7 | | 0,3 | | 0,4 |
| 0,500 | 118,3 | 51,0 | 353,1 | 32,1 | | 0,4 | | 0,7 | | 0,3 | | 0,4 |
| 0,250 | 305,2 | 24,9 | 153,4 | 6,5 | | 0,4 | | 0,7 | | 0,3 | | 0,4 |
| 0,125 | 127,4 | 8,9 | 33,5 | 0,6 | | 0,4 | | 0,7 | | 0,3 | | 0,4 |
| 0,063 | 53,8 | 2,2 | 3,1 | 0,1 | | 0,4 | | 0,7 | | 0,3 | | 0,4 |
| pass | 17,6 | 0,0 | 0,5 | 0,0 | 5,5 | 0,0 | 9,5 | 0,0 | 10 | 0,0 | 11,2 | 0,0 |
| tot. g | 799,9 | | 599,8 | | 1799,9 | | 1499,9 | | 2999,8 | | 3000 | |
| Fineness modulus UNI EN 933-1 | 2,867 | | 2,899 | | 5,934 | | 6,973 | | 7,764 | | 8,864 | |

| sand equivalent UNI EN 933/8-9 | 75,6% | | | | | |
|---|---|---|---|---|---|---|
| Absorption UNI EN 1097-6 | 3,00% | 1,10% | 1,00% | 0,90% | 0,80% | 0,70% |
| M.V. UNI EN 1097-6 | 2,62 | 2,700 | 2,69 | 2,69 | 2,69 | 2,69 |
| Not | | | | | | |

CONCRETE MIX DESIGN AND METHOD FOR REALIZING DAM OR OTHER MASSIVE STRUCTURE BY USING THE CONCRETE MIX DESIGN

The present application is a National Phase Entry of PCT International Application No. PCT/IB2020/054631, which was filed on May 15, 2020, and claims priority to U.S. patent application Ser. No. 62/849,389, which was filed on May 17, 2019, the contents of which are hereby incorporated by reference.

TECHNICAL FIELD

The present invention relates to a concrete mix design and placement method for realizing dam or other massive structure by using the concrete mix design approach.

In particular, the mix design of the present invention has been optimized for the construction of dams (or other massive structures) to be placed by no-conventional means.

BACKGROUND ART

For several years, the problem of the durability and cost of construction of concrete structures was a major topic of interest in particular in the construction of dams.

A dam is a huge construction that needs massive amount of concrete to build it with and that leads to high cost, so alternative methods should be considered to minimize the cost of constructing the dams with new material methods.

One known method is building the dams with Roller Compacted Concrete (RCC), which by definition is a composite construction material with no-slump consistency in its unhardened state and it has achieved its name from the construction method. The definition for a no-slump consistency is a freshly mixed concrete with a slump less than 6 mm.

The RCC is placed with the help of paving and earth-moving equipment and then it is compacted by vibrating roller equipment from the surface rather than with immersion type vibrators. The basic ingredients RCC mix designs are the same as for the conventional concrete but it has different ratios in the materials that are blended to produce concrete that yields an entirely different set of fresh properties that normal weigh concrete. It differs when it comes to aggregates because both similar aggregates used in conventional concrete or aggregates that do not fulfill the normal standards can be used in the RCC mixtures, in particular the amount of fines (% passing ASTM E11 Sieve #200, minus 75 micron) and smaller sieve sizes in the sand fraction.

The RCC dams are usually built in thin, horizontal lifts, in such a way to reduce the amount of formwork and allow for successful external consolidation by vibratory rollers.

RCC addressed two factors to lower the cost and decrease the time of concrete dam construction:

Reducing the amount of water, and therefore cement, in the mix design. This resulted in a direct savings in material cost, without a decrease in strength. Cement is the second greatest material cost after aggregates;

Reducing the dependency on labor on the construction process to a greater extent, both in the skill level and number of workers. This savings was two-fold:
Increased mechanization allowed for faster construction periods, i.e. machines can do more work than people;
Decreased dependency on labor lessoned the risk of obtaining skilled workers, as well as number of workers required for a project.

One of the key concepts in the RCC method of building dams is to place one large lift of concrete, about 300 mm in depth, in a continuous manner for the entire surface of the dam, covering each layer with another layer before the initial set of the previous layer. This results in a chemical bond between the layers and results in a more monolithic structure.

Because RCC is dryer than normal mass concrete, dozers can spread the material and double or single drum vibrating rollers compact the RCC (similar to building an asphalt road). This is opposed to immersion type vibrators used in typical mass concrete.

The method of one layer of continuous placement is opposed to the method of individual blocks used in conventional mass concrete construction.

Figure 1A:
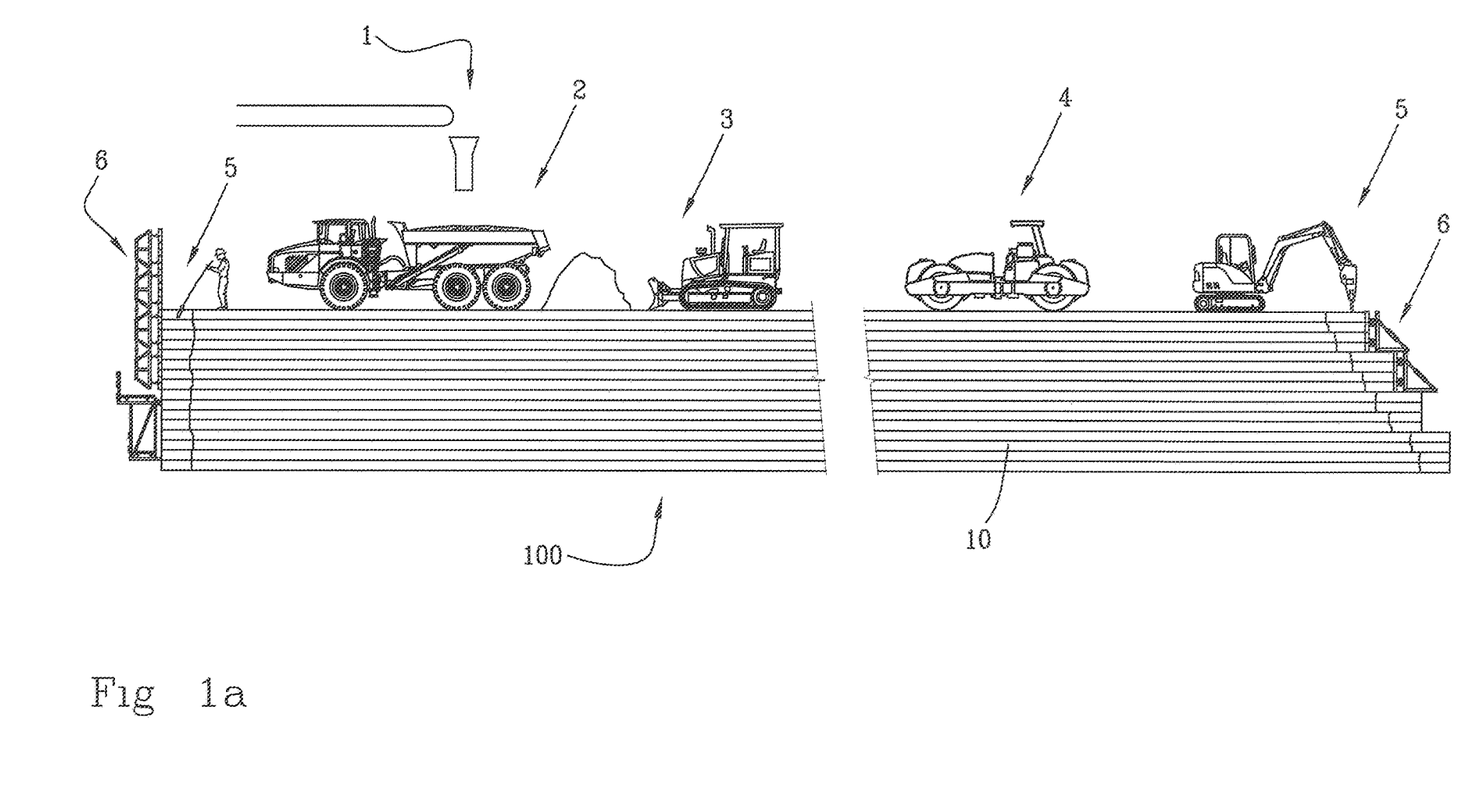
FIG. 1*a* illustrates a Roller compacting concrete (RCC) method used for realizing a dam in the known prior art.

So, the key steps in RCC Dam 100 construction are (FIG. 1*a*):

Batching of RCC 10,
Delivery 1 to the dam 100,
Transfer 2 to placing location on the dam,
Spreading 3 the RCC,
Compacting 4 the RCC,
GEVR placement 5,
Associated formwork 6.

However, for RCC method it is necessary to use machines for spreading and compacting the lifts. FIG. 1*a* represents the known prior art relative to the RCC used for a dam construction activity.

In particular, this type of construction consumes huge amount of construction material and takes long construction period which increases overhead cost and significantly affect the environment.

DISCLOSURE OF THE INVENTION

In this context, the technical task underlying the present invention is to propose a concrete mix design and a method of placement for realizing dam or other massive structure by using the concrete mix design that overcomes the drawbacks of the prior art mentioned above.

In particular, it is an object of the present invention to provide a structural mix design which could be used for a massive self-compacting concrete (MSCC) method for realizing a dam.

In detail, it is an object of the present invention to reduce both the equipment and machines used as well as the number of people in construction process for building dams further still from the RCC method of construction as well as traditional conventionally cast and immersion vibrated concrete.

BRIEF DESCRIPTION OF DRAWINGS

Additional features and advantages of the present invention will become more evident from the approximate and thus non-limiting description of a preferred but non-exclusive embodiment of a concrete mix design and a method of placement for realizing dam or other massive structure by using the concrete mix design, as illustrated in the appended drawings, in which.

With reference to the drawings, they serve solely to illustrate embodiments of the invention with the aim of better clarifying, in combination with the description, the inventive principles of the invention.

DETAILED DESCRIPTION OF PREFERRED EMBODIMENTS OF THE INVENTION

The present invention refers to a concrete mix design and method for realizing dam 100 or other massive structure by using Self-compacting/Self-consolidating Concrete 101, particularly mass structural concrete.

In particular, the specific concrete below described for the present invention is a massive self levelling concrete 101 (MSCC) which is different from concrete used for an known SCC.

There have been laboratory investigations to determine the feasibility of developing a normal weight, Self-compacting/Self-consolidating, portland cement based concrete mix design. It is envisioned that the mix design of the present invention has highly modified dosages (with respect to conventional Roller Compacted Concrete) of various admixes to enable the ability to flow freely and self-compact and thought to be outside of presently known building codes and practices.

The massive self-compacting/self-leveling concrete 101 is being developed for use in mass and conventional concrete structures, both reinforced and unreinforced, to allow for little or no internal or external consolidation effort. Typical applications include, but are not limited to, gravity dams 100, arch dams 100, foundation slabs, runways, bridge abutments and other members, loch walls, ballast blocks, and other concrete structures.

The concrete mix design provide that:
Slump and cement content are related, mainly by water/cement ration (w/c), but also with the total amount of cement (and/or fly ash) and other variables.
Slump is also effected by the gradation of the aggregate, the overall gradation as well as the amount of very fine material at the bottom end of the gradation.
At the finer end of the gradation (minus #200 ASTM Sieve, minus 75 micron) the material can start to "act" like cement/fly ash in terms of influencing slump, but can add or subtract, so it gets fairly tricky, fairly quick.
Sometimes the same material (minus 75 micron) can also effect the hardened properties (meaning it sometimes contributes to the strength, although this is again tricky).
The very fine material in the aggregate can also effect the w/c that will influence the hardened properties (Strength, as well as others).
Addition of chemical admixtures.
Cement content, w/c, and other properties also effect the Modulus of Elasticity, an important hardened property.

In particular, the mix design depends on a "heavily" influenced mix in terms of chemical admixtures to take advantage of advances in the industry.

It is used a lower cement/fly ash content, for many reasons, some of which are heat of hydration (trying to reduce), as well as economy, as well as shrinkage.

Further, it is using a "dirty" sand. This means that there is more fine material at the bottom end of the gradation that would be normally used for traditional structural or mass concrete.

Below is described an example of realizing the concrete design mix:
The cementitious (Cement+Fly Ash) would preferably be in the 250 kg minus range, ideally 200 kg minus, per m3 (low cementitious content). This compares to closer to circa 300 (and greater) kg for regular structural concrete.
The fines content (minus 75 micron sieve size) would be significantly more that would be allowed for normal structural concrete.
ASTM C33 sets a limit on passing the 75 micron sieve for fine aggregate to be 0 to 3%, up to 5% in some instances depending on the concrete use, and up to 7% for rock type and concrete use.
For coarse aggregates the limit is basically 0, as there should be no passing the 75 micron in the coarse aggregate, although it is not uncommon to have a %1 or some fraction.
We are looking to use a combined gradation of greater than %10, and possibly up to %15. This puts us in a different category than normal I believe.
Water content of the mix design is comprised between 150 $l/m^3$ and 250 $l/m^3$ and preferably 200 $l/m^3$.

Figure 3A:
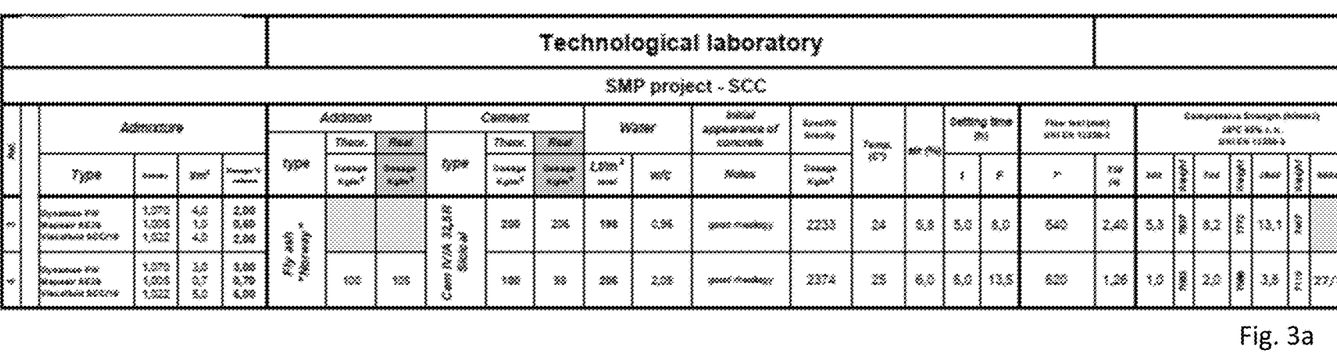
FIGS. 3a, 3b, 3c, 3d illustrates a table and a graph and a photo of the mix design analysis.
Figure 3B:
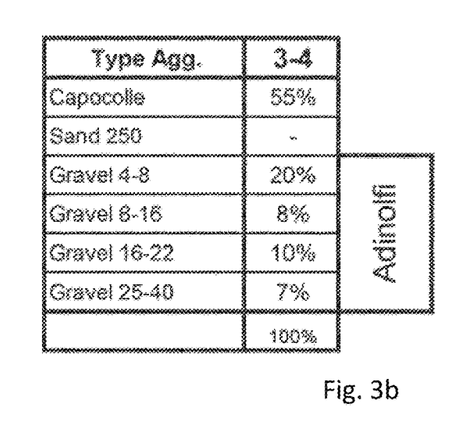
Figures 3C, 3D:
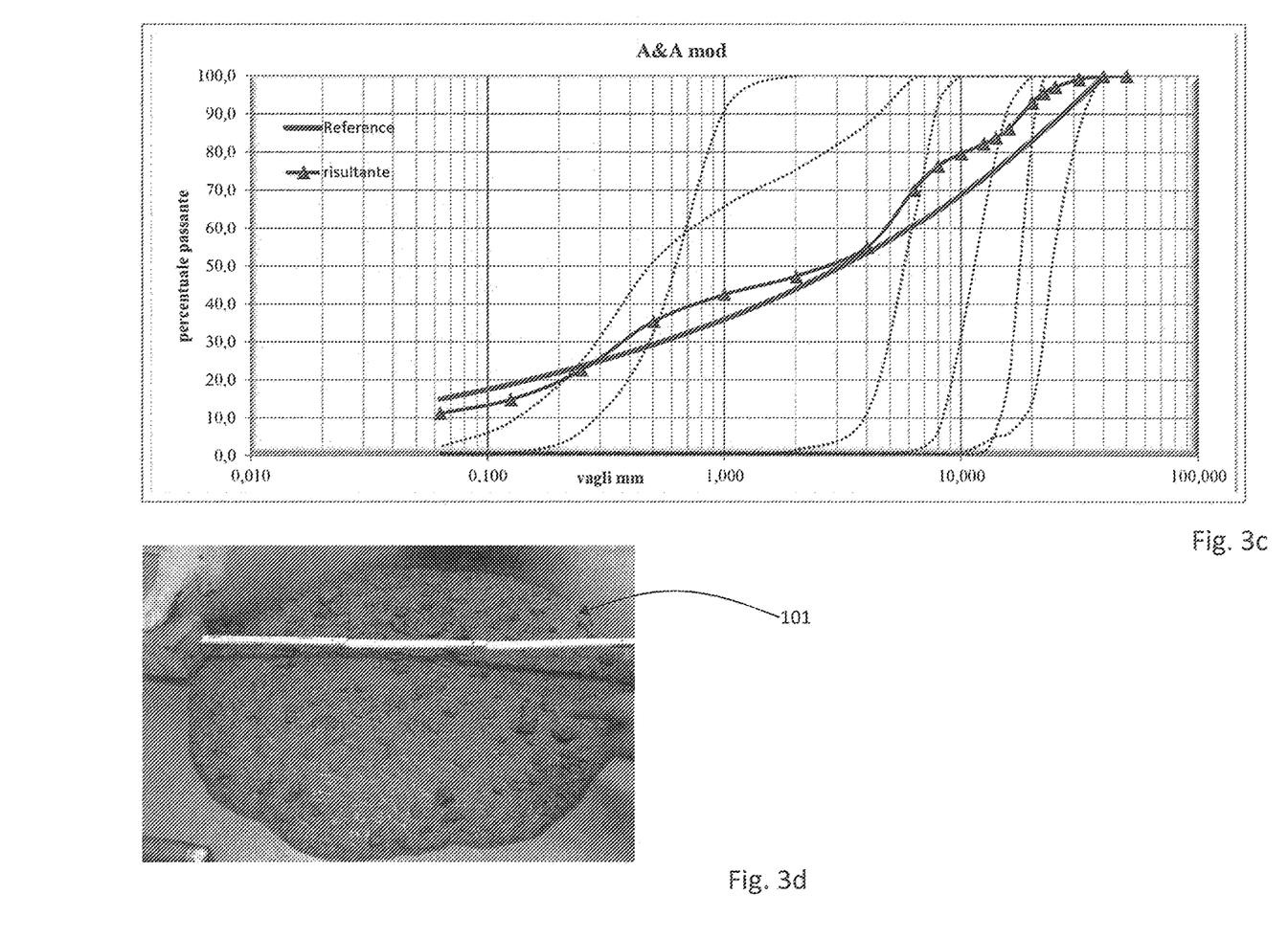

Regarding the chemical admixtures, they are showed and indicated in the table represented in FIG. 3a.

In detail, chemical admixtures comprising one or more components, preferably all these components, selected between the following list:
an acrylic, formaldehyde-free polymer-based admixture, modified in aqueous solution (Dynamon PW by MAPEI®);
a surfactant admixture configured to entrain micro air bubbles in concrete (Mapeair AE 20 by MAPEI®);
an organic polymer comprising hydrophilic groups for increasing the viscosity of the mixture (Viscofluid SCC/10 by MAPEI®).

The acrylic formaldehyde-free polymer-based admixture has a density of 1.07 $g/m^3$, a dosage comprised between 3 liter/$m^3$ and 4 liter/$m^3$ of cementitious content and a dosage comprised between 2% and 3% liter/$m^3$ of the volume of the cementitious content.

The surfactant admixture has a density of 1,005 $g/m^3$, a dosage comprised between 0.7 liter/$m^3$ and 1 liter/$m^3$ of cementitious content and a dosage comprised between 0.5% liter/$m^3$ and 0.7% liter/$m^3$ of the volume of the cementitious content.

The organic polymer admixture has a density of 1,022 $g/m^3$, a dosage comprised between 4 liter/$m^3$ and 5 liter/$m^3$ of cementitious content and a dosage comprised between 2% liter/$m^3$ and 5% liter/$m^3$ of the volume of the cementitious content.

Testing Standards:
ASTM standards are the main referenced standards, although equivalent internationally recognized standards may be substituted.
Initial targets, fresh properties:
Slump—no lower limit on slump, upper limit to be evaluated against the followability and Self-consolidation, tested by ASTM C143 and ASTM C230.

Initial/Final Set Time—No requirements for initial or final set time will be established in the initial trials, but will be tested in accordance with ASTM C403.

Temperature—No requirements for temperature shall be established in the initial trials, provide the mix is not subject to hot or cold placing temperature conditions as described by ACI, tested by ASTM C1064.

Air content—5%, +/−1%, by ASTM C231. Although lesser % of air contents are also to be considered.

Initial Targets, Hardened Properties, Mechanical:
　Unit weight—No target, but will be tested according to ASTM C138
　Compressive strength—Strength targets will be between 10 and +/−30 Mpa at 365 days, ASTM C39 and ASTM C31
　Tensile strength—No target, but will be tested, ASTM C496
　Modulus of Elasticity—No target, but will be tested, ASTM 469
　Poisson ratio—No target, but will be tested, ASTM 469

Initial Targets, Hardened Properties, Thermal:
　(no thermal properties will be tested until satisfactory fresh and hardened mechanical properties are established. However, the following are test envisioned for the thermal properties testing:
　Adiabatic temperature rise
　Diffusivity
　Coefficient of thermal expansion
　Specific heat of concrete Initial Targets, Materials:
　Portland Cement—Type I/II, ASTM C150
　Fly Ash—Type F and C, ASTM C618
　Mineral filler, both natural and manufactured, to be evaluated as a fly ash replacement
　Water—Clean and potable, including:
　Water Soluble Chloride, ASTM C1218
　Aggregates—ASTM C33, including:
　C127 Standard Test Method for Relative Density (Specific Gravity) and Absorption of Coarse Aggregate
　C128 Standard Test Method for Relative Density (Specific Gravity) and Absorption of Coarse Aggregate
　Sand equivalency—ASTM D2419
　Flakiness and Elongation—BS 812
　Admixtures—To be determined in first stage of initial trials, generally conforming to the following:
　ASTM C494
　ASTM C260

Initial Targets, Coarse Aggregate Grading

| Sieve Size | Percentage passing indicated sieve size | | |
|---|---|---|---|
| (mm) | 20-40 | 10-20 | 4.75-10 |
| 63 | 100 | | |
| 40 | 85-100 | 100 | |
| 20 | 0-20 | 85-100 | |
| 12.5 | | | 100 |
| 10 | 0-5 | 0-20 | 85-100 |
| 4.75 | 0 | 0-5 | 0-20 |
| 2.36 | | | 0-5 |

Initial Targets, Fine Aggregate Grading

| Sieve Size (mm) | Percentage passing indicated sieve size Sand |
|---|---|
| 9.5 | 100 |
| 4.75 | 95-100 |
| 2.36 | 80-95 |
| 1.18 | 65-90 |
| 0.60 | 40-70 |
| 0.300 | 15-35 |
| 0.150 | 10-25 |
| 0.075 | 8-18 |
| FM | 3.5-2.3 |

Initial Targets, Mix Proportions:
　Mix proportions will be determined after initial review of proposed admixture types and dosages, as well as actual determination of:
　Aggregate specific gravities
　Aggregate absorptions
　Aggregate moisture contents Initial Additional Testing, where Deemed Required:
　C29/C29M Test Method for Bulk Density ("Unit Weight") and Voids in Aggregate
　C31 Standard Practice for Making and Curing Concrete Test Specimens in the Field
　C33 Standard Specification for Concrete Aggregates
　C39 Standard Test Method for Compressive Strength of Cylindrical Concrete Specimens
　C40 Test Method for Organic Impurities in Fine Aggregates for Concrete
　C87 Test Method for Effect of Organic Impurities in Fine Aggregate on Strength of Mortar
　C88 Test Method for Soundness of Aggregates by Use of Sodium Sulfate or Magnesium Sulfate
　C94 Standard Specification for Ready-Mixed Concrete
　C117 Test Method for Materials Finer than 75-μm (No. 200) Sieve in Mineral Aggregates by Washing
　C123 Test Method for Lightweight Particles in Aggregate
　C125 Terminology Relating to Concrete and Concrete Aggregates
　C127 Standard Test Method for Relative Density (Specific Gravity) and Absorption of Coarse Aggregate
　C128 Standard Test Method for Relative Density (Specific Gravity) and Absorption of Fine Aggregate
　C131 Test Method for Resistance to Degradation of Small-Size Coarse Aggregate by Abrasion and Impact in the Los Angeles Machine
　C136 Test Method for Sieve Analysis of Fine and Coarse Aggregates
　C138 Standard Test Method for Density (Unit Weight), Yield, and Air Content (Gravimetric) of Concrete
　C142 Test Method for Clay Lumps and Friable Particles in Aggregates
　C150 Specification for Portland Cement
　C157 Standard Test Method for Length Change of Hardened Hydraulic-Cement, Mortar, and Concrete
　C227 Test Method for Potential Alkali Reactivity of Cement-Aggregate Combinations (Mortar-Bar Method)
　C230 Standard Specification for Flow Table for Use in Tests of Hydraulic Cement
　C231 Standard Test Method for Air Content of Freshly Mixed Concrete by the Pressure Method
　C289 Test Method for Potential Alkali-Silica Reactivity of Aggregates (Chemical Method)
　C294 Descriptive Nomenclature for Constituents of Concrete Aggregates C295 Guide for Petrographic Examination of Aggregates for Concrete
C311 Test Methods for Sampling and Testing Fly Ash or Natural Pozzolans for Use in Portland-Cement Concrete
C330 Specification for Lightweight Aggregates for Structural Concrete
C331 Specification for Lightweight Aggregates for Concrete Masonry Units
C332 Specification for Lightweight Aggregates for Insulating Concrete
C342 Test Method for Potential Volume Change of Cement-Aggregate Combinations (Withdrawn 2001)4
C403 Standard Test Method for Time of Setting of Concrete Mixtures by Penetration Resistance
C441 Test Method for Effectiveness of Pozzolans or Ground Blast-Furnace Slag in Preventing Excessive Expansion of Concrete Due to the Alkali-Silica Reaction
C469 Standard Test Method for Static Modulus of Elasticity and Poisson's Ratio of Concrete in Compression
C496 Standard Test Method for Splitting Tensile Strength of Cylindrical Concrete Specimens
C535 Test Method for Resistance to Degradation of Large-Size Coarse Aggregate by Abrasion and Impact in the Los Angeles Machine
C586 Test Method for Potential Alkali Reactivity of Carbonate Rocks as Concrete Aggregates (Rock-Cylinder Method)
C595 Specification for Blended Hydraulic Cements
C618 Specification for Coal Fly Ash and Raw or Calcined Natural Pozzolan for Use in Concrete
C637 Specification for Aggregates for Radiation-Shielding Concrete
C638 Descriptive Nomenclature of Constituents of Aggregates for Radiation-Shielding Concrete
C666/C666M Test Method for Resistance of Concrete to Rapid Freezing and Thawing
C989 Specification for Slag Cement for Use in Concrete and Mortars
C1105 Test Method for Length Change of Concrete Due to Alkali-Carbonate Rock Reaction
C1064 Standard Test Method for Temperature of Freshly Mixed Hydraulic-Cement Concrete
C1157 Performance Specification for Hydraulic Cement
C1218 Water Soluble Chloride
C1240 Specification for Silica Fume Used in Cementitious Mixtures
C1260 Test Method for Potential Alkali Reactivity of Aggregates (Mortar-Bar Method)
C1293 Test Method for Determination of Length Change of Concrete Due to Alkali-Silica Reaction
C1567 Test Method for Determining the Potential Alkali-Silica Reactivity of Combinations of Cementitious Materials and Aggregate (Accelerated Mortar-Bar Method)
D75 Practice for Sampling Aggregates
D422 Test Method for Particle-Size Analysis of Soils
D2419 Test Method for Sand Equivalent Value of Soils and Fine Aggregate
D3665 Practice for Random Sampling of Construction Materials
E11 Specification for Woven Wire Test Sieve Cloth and Test Sieves
ACI 318

Regarding the method for realizing dam 100 or other massive structure by using the concrete mix design, one of the key concepts in the MSCC 101 concept of building dams 100 is to borrow the RCC method of placing concrete for the entire lift surface, but using gravity to accomplish the compaction effort, thus eliminating much of the required equipment.

If the concrete can behave more closely to the properties of an ideal fluid, then it will be self-leveling, and no need for compaction effort.

Assuming that the construction process would be similar to RCC construction and be placed in one continuous lift across the entire dam 100 surface with a massive self-leveling type of concrete, precast elements 7 could be used for the US and DS facing elements.

These would be left in place after construction, and the erection process to be heavily automated. Conventional formwork 6 solutions could also be utilized.

The overall placement of the MSCC 101 for the dam 100 construction aims to be similar to 3D printing, where the user directly deposit the material at the point needed for construction, and move forward at a rapid rate until completion with the minimal amount of unit processes involved during construction.

So, the key steps in MSCC 101 Dam 100 construction are:
Batching of MSCC 101;
Positioning formworks 6;
Delivery 1 of the MSCC 101 to the dam 100;
Self levelling and self compacting of the MSCC 101;
Removal of the formworks 6.

Figure 1B:
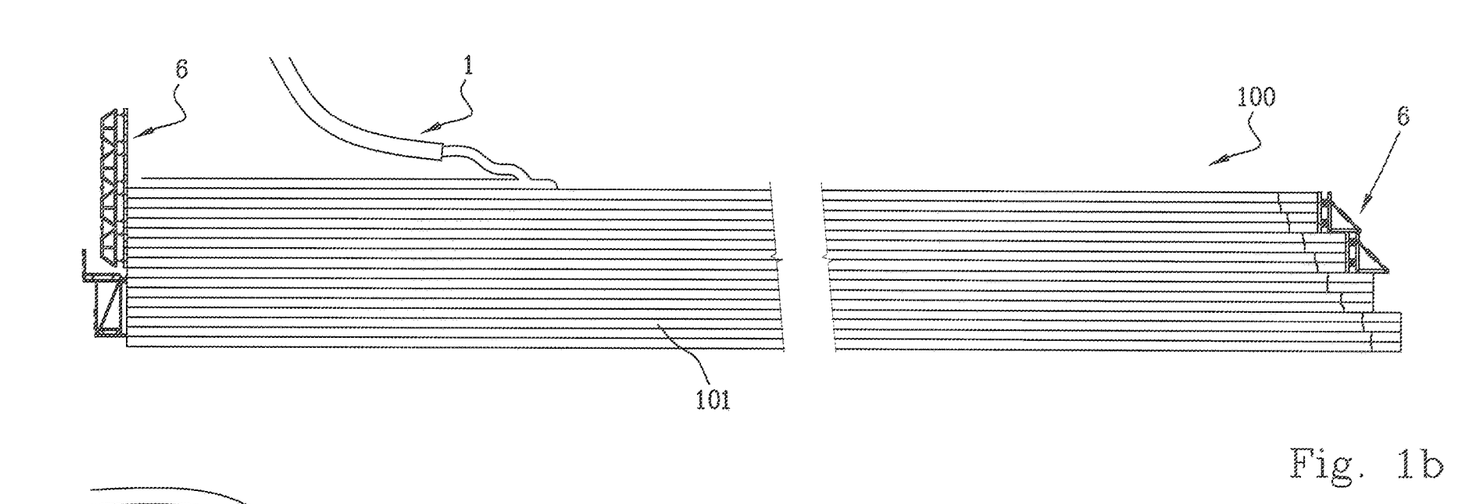
FIG. 1b illustrates a Massive Self compacting concrete (MSCC) method used for realizing a dam according to a first embodiment of the present invention.
Figure 1C:
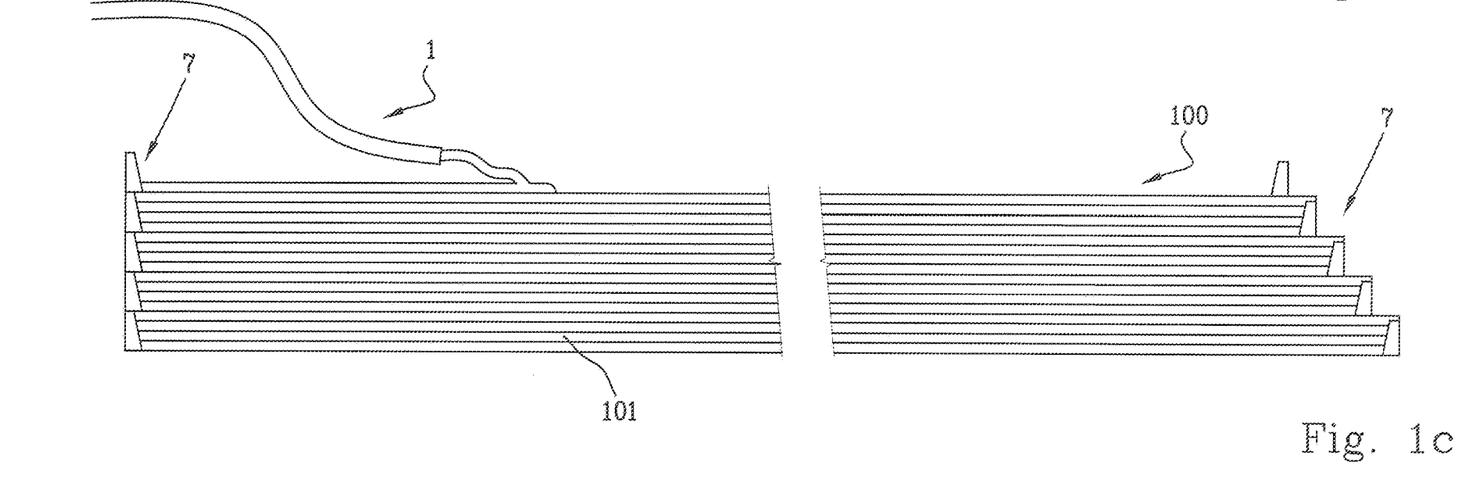
FIG. 1c illustrates a Massive Self compacting concrete (MSCC) method used for realizing a dam according to a second embodiment of the present invention.
Figure 2A:
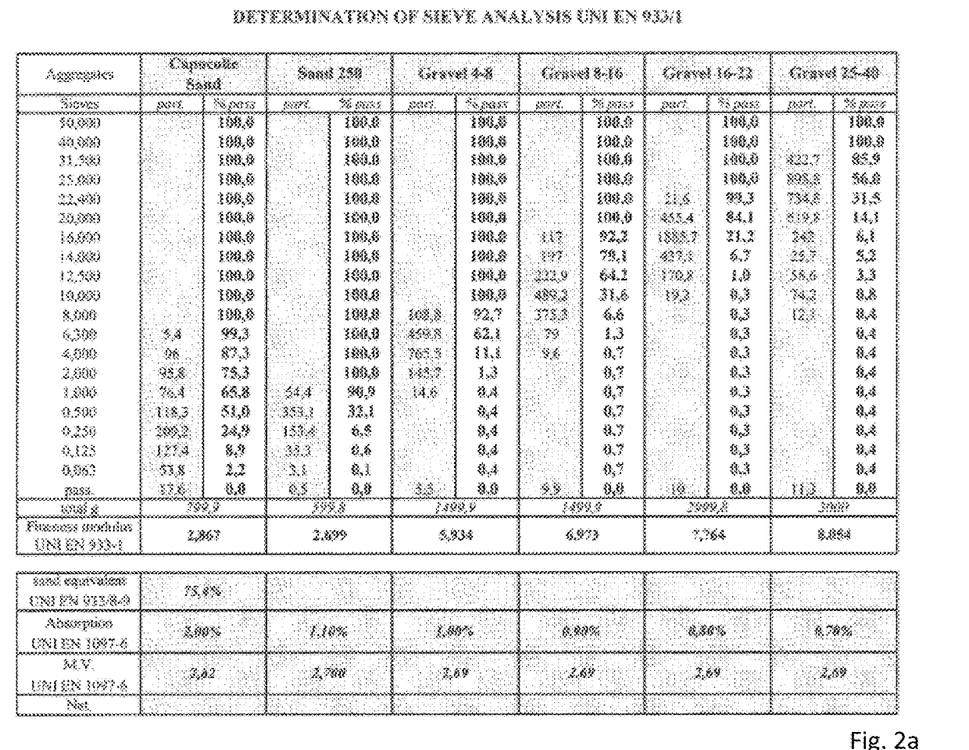
FIGS. 2a, 2b illustrates a table and a graph of the sieve analysis composing the mix design.
Figure 2B:
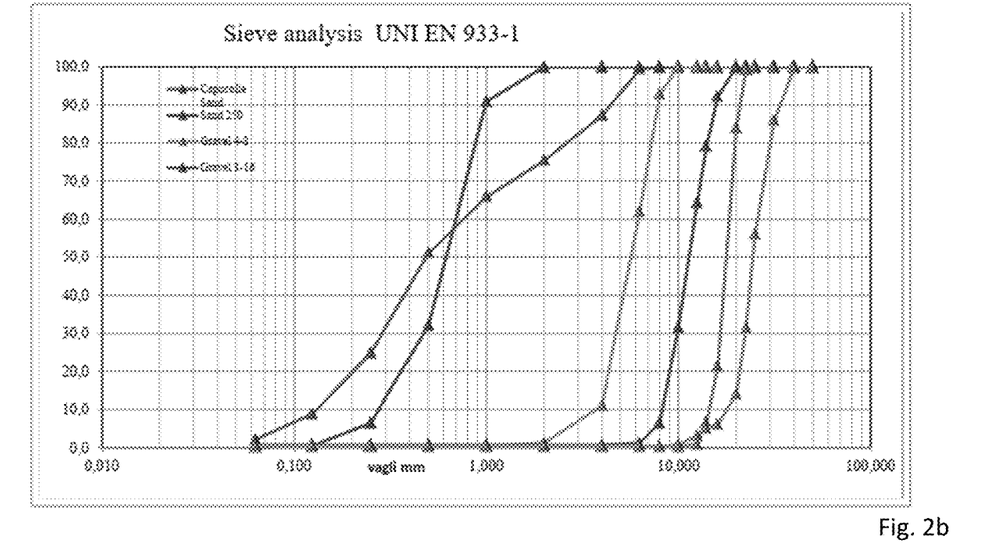

In particular, with reference to FIGS. 1b and 1c, the first phases of MSCC 101 batching and delivery to dam 100 are advantageously performed through pumping means rather than by gravity. In fact the new concrete mix design allows to be pumped while the existing RCC cannot be pumped.

This aspect is advantageous because the new concrete could be easily transported and placed at the dam 100 location.

FIGS. 1b and 1c illustrate two embodiments of the method according to the present invention:

FIG. 1b shows steps of using US and DS formworks 6 (made of plastic or metals or other materials) that contains the area to be poured by fresh MSCC 101;

FIG. 1c shows steps of using US and DS precast 7 formworks that pile on one another, and pouring fresh MSCC 101 into the voids between them and produce a consolidated concrete structure.

Further, it has to be noted that the new concrete mix design avoids the external vibrating phase of concrete otherwise provided for the RCC method (FIG. 1a), as well as the internal vibrating phase with conventional concrete.

The invention claimed is:
1. A method for realizing a dam or other massive structure, the method comprising the steps of:
batching of massive self-compacting concrete (MSCC) comprising a concrete mix comprising:
cementitious content comprising fly ash, the cementitious content less than 250 kg/m$^3$;
dirty sand comprising between 3% and 15% fine aggregates;
water content between 150 l/m$^3$ and 250 l/m$^3$; and
a chemical admixture comprising one or more components selected from the following:
an acrylic, formaldehyde-free polymer-based admixture, modified in aqueous solution;
a surfactant admixture configured to entrain micro air bubbles in concrete; and
an organic polymer comprising hydrophilic groups for increasing the viscosity of the mixture;

spreading the MSCC by placing it in one continuous lift across the entire surface of the dam or other massive structure; and waiting for self-compacting of the MSCC.

2. The method according to claim 1, wherein spreading the MSCC is realized by pumping the MSCC.

3. The method according to claim 1, wherein spreading the MSCC is realized without external vibration of the concrete.

4. The method according to claim 1, wherein the chemical admixture comprises all of the following components:
   an acrylic, formaldehyde-free polymer-based admixture, modified in aqueous solution;
   a surfactant admixture configured to entrain micro air bubbles in concrete; and
   an organic polymer comprising hydrophilic groups for increasing the viscosity of the mixture.

5. The method according to claim 1, wherein the acrylic formaldehyde-free polymer-based admixture has a density of 1.07 g/m$^3$.

6. The method according to claim 1, wherein the acrylic formaldehyde-free polymer-based admixture has a dosage between 3 liter/m$^3$ and 4 liter/m$^3$ of cementitious content.

7. The method according to claim 1, wherein the acrylic formaldehyde-free polymer-based admixture has a dosage between 2% and 3% liter/m$^3$ of the volume of the cementitious content.

8. The method according to claim 1, wherein the surfactant admixture has a density of 1.005 g/m$^3$.

9. The method according to claim 1, wherein the surfactant admixture has a dosage between 0.7 liter/m$^3$ and 1 liter/m$^3$ of cementitious content.

10. The method according to claim 1, wherein the surfactant admixture has a dosage between 0.5% liter/m$^3$ and 0.7% liter/m$^3$ of the volume of the cementitious content.

11. The method according to claim 1, wherein the organic polymer admixture has a density of 1.022 g/m$^3$.

12. The method according to claim 1, wherein the organic polymer admixture has a dosage between 4 liter/m$^3$ and 5 liter/m$^3$ of cementitious content.

13. The method according to claim 1, wherein the organic polymer admixture has a dosage between 2% liter/m$^3$ and 5% liter/m$^3$ of the volume of the cementitious content.

14. The method according to claim 1, wherein the concrete mix is self levelling and self compacting.

* * * * *